United States Patent
Cimatti

(10) Patent No.: US 10,882,431 B2
(45) Date of Patent: Jan. 5, 2021

(54) ROAD VEHICLE PROVIDED WITH AN ELECTRIC DRIVE

(71) Applicant: FERRARI S.p.A., Modena (IT)

(72) Inventor: Franco Cimatti, Pavullo (IT)

(73) Assignee: FERRARI S.P.A., Modena (IT)

( * ) Notice: Subject to any disclaimer, the term of this patent is extended or adjusted under 35 U.S.C. 154(b) by 166 days.

(21) Appl. No.: 16/217,114

(22) Filed: Dec. 12, 2018

(65) Prior Publication Data

US 2019/0202331 A1 Jul. 4, 2019

(30) Foreign Application Priority Data

Dec. 13, 2017 (IT) .................. 102017000143862

(51) Int. Cl.
| | |
|---|---|
| *B60N 2/90* | (2018.01) |
| *H04B 3/36* | (2006.01) |
| *G05D 19/02* | (2006.01) |
| *A63F 9/24* | (2006.01) |
| *B60W 50/16* | (2020.01) |
| *B60L 50/00* | (2019.01) |
| *B60Q 9/00* | (2006.01) |
| *B60K 6/22* | (2007.10) |

(52) U.S. Cl.
CPC .............. *B60N 2/90* (2018.02); *B60L 50/00* (2019.02); *B60Q 9/00* (2013.01); *B60W 50/16* (2013.01); *B60K 6/22* (2013.01); *B60L 2250/00* (2013.01); *B60N 2002/981* (2018.02); *B60Y 2200/91* (2013.01); *B60Y 2200/92* (2013.01)

(58) Field of Classification Search
CPC ........... B60N 2/90; G06F 17/00; G06F 11/30; B60Q 1/00; H04B 3/36; B60W 50/16; G08B 23/00; G05D 19/02; A63E 9/24
See application file for complete search history.

(56) References Cited

U.S. PATENT DOCUMENTS

| | | | | |
|---|---|---|---|---|
| 5,635,903 A | * | 6/1997 | Koike ................. | A63H 17/34 340/384.1 |
| 6,087,942 A | * | 7/2000 | Sleichter, III .......... | B60N 2/56 340/576 |

(Continued)

FOREIGN PATENT DOCUMENTS

DE 102008040113 A1 1/2010

OTHER PUBLICATIONS

Search Report and Written Opinion for IT Application No. 201700143862 completed Aug. 10, 2018 (7 pages).

*Primary Examiner* — Yuri Kan
(74) *Attorney, Agent, or Firm* — Cantor Colburn LLP

(57) ABSTRACT

Road vehicle provided with an electric drive and having: at least one pair of drive wheels; at least one electric machine; a mechanical transmission that connects the electric machine to the drive wheels; a passenger compartment; at least one seat, which is housed in the passenger compartment and is provided with at least one mechanical exciter that is designed to generate mechanical vibrations at variable frequencies and intensities; and a control unit, which is designed to drive the mechanical exciter using a driving signal that derives from the noise generated by an internal combustion thermal engine and based on the speed of rotation of the electric machine and/or on the speed of rotation of the drive wheels and/or on the torque generated/absorbed by the electric machine.

18 Claims, 7 Drawing Sheets

(56) References Cited

U.S. PATENT DOCUMENTS

| | | | |
|---|---|---|---|
| 2002/0082754 A1* | 6/2002 | Robichaux | B60W 20/00 |
| | | | 701/22 |
| 2011/0053691 A1* | 3/2011 | Bryant | A63F 13/245 |
| | | | 463/37 |
| 2011/0187521 A1* | 8/2011 | Beruscha | G10K 15/02 |
| | | | 340/441 |
| 2012/0283939 A1* | 11/2012 | Bobbitt, III | B60W 50/16 |
| | | | 701/123 |
| 2013/0090795 A1* | 4/2013 | Luke | B60L 3/00 |
| | | | 701/22 |
| 2013/0238146 A1* | 9/2013 | Vau | F16F 15/002 |
| | | | 700/280 |

* cited by examiner

ROAD VEHICLE PROVIDED WITH AN ELECTRIC DRIVE

CROSS-REFERENCE TO RELATED APPLICATIONS

This patent application claims priority from Italian patent application no. 102017000143862 filed on Dec. 13, 2017, the entire disclosure of which is incorporated herein by reference.

TECHNICAL FIELD

The present invention relates to a road vehicle provided with an electric drive.

PRIOR ART

When a road vehicle is driven by a thermal engine, the thermal engine generates relatively intense noise and vibrations, essentially due to the bursts (i.e. the violent combustion) inside the cylinders and to the reciprocating motion (pistons-connecting rods-cranks). Obviously, the noise and the vibrations are linked to the speed of rotation of the drive shaft (in commercial and petrol-fuelled internal combustion engines, the speed of rotation is normally between 600-900 rpm at the minimum and 6000-9000 rpm in the most performing engines). The noise and the vibrations generated by the thermal engine are transmitted (in a more or less attenuated way) inside the passenger compartment and are therefore clearly perceived by the occupants of the passenger compartment and in particular by the driver. Particularly when sporty driving a high performance road vehicle, the noise and the vibrations perceived by the driver are an integral part of the driving experience and contribute to transmitting positive feelings to the driver. In other words, when a driver drives a high performance road vehicle in a sporting manner, besides obtaining accelerations and high speeds, she/he also expects to perceive a certain type of noise and a certain type of vibrations, whose absence (or strong attenuation) is therefore negative.

When a road vehicle is driven by an electric machine (working as an electric engine), the electric machine generates a noise solely due to the high-speed rotary motion and generates vibrations solely due to electrical and mechanical imbalances. Obviously, the noise and the vibrations are linked to the speed of rotation of the electric machine drive shaft (in commercial electric machines used in the automotive sector the speed of rotation is normally between 0 rpm and 16000-20000 rpm). Consequently, in a road vehicle the vibrations and the noise generated by a thermal engine are very different from the vibrations and the noise generated by an electric machine, both in terms of intensity (which is decidedly lower in the electric machine) and in terms of frequency (generally much higher in the electric machine). For example, the sound produced by a thermal engine is perceived by the driver like a rumble (namely, like a loud and deep noise), whereas the sound produced by an electric machine is perceived by the driver as an acute and tenuous hiss (namely, much more similar to an electrical appliance than to a conventional machine).

In other words, electric road vehicles are characterized by the replacement of a combustion-driven thermal engine provided with a reciprocating motion (pistons-connecting rods-cranks) with a rotary electric engine. The familiar feeling for the users of road vehicles driven by thermal engines is the presence of vibro-acoustics linked to the engine orders of the thermal engine (both as combustion and as oscillating dynamics). The engine orders are linked to the number of cylinders set in motion by rotation, and are therefore proportional to the engine speed of rotation. This familiar feeling is almost completely lacking in electric drive vehicles due to the absence of combustion, the absence of alternate motion mechanics, the foreseeable simplification of the transmission lines and the different (even several times higher) speeds of rotation of the electric engines. Thus, not only do the levels change, but also the frequencies of vibro-acoustic sensations, with the presence of predictably higher frequencies. On the contrary, in the overall noise of an electric road vehicle, the part not linked to the powertrain increases: the aerodynamic noise based on the speed of the road vehicle, the rolling noise of the wheels on the road and the noise of the devices on board the vehicle (air conditioning, automatic actuations . . . ).

In case of an electric drive and trying to compensate for the absence of the usual noise of a thermal engine, it has been proposed to use speakers installed in the passenger compartment to artificially generate a sound that can simulate in a more or less faithful way the noise of a thermal engine. However, the use of the speakers installed in the passenger compartment to generate a noise from a thermal engine tends to generate a noise that is perceived by the driver as not very natural (and therefore unpleasant since "artificial").

The patent application DE102008040113A1 describes a hybrid-driven road vehicle, therefore provided with a transmission line comprising an internal combustion thermal engine and an electric machine that can operate as an engine. A mechanical exciter is incorporated in a driver's seat, said exciter being designed to generate mechanical vibrations and, when the thermal engine is switched off, being driven based on the status of the transmission line to indicate when the transmission line is active and therefore ready to respond to the accelerator command.

The U.S. Pat. No. 5,635,903A describes an electric vehicle provided with (at least) a loudspeaker arranged inside the passenger compartment and (at least) a loudspeaker arranged outside the bodywork. Both speakers are driven to reproduce a sound depending on a speed of rotation of the wheels, a vehicle advancement speed, a position of an accelerator control and an ambient noise captured by a microphone.

The patent application US2002082754A1 describes a hybrid-driven road vehicle that is therefore provided with a transmission line comprising an internal combustion thermal engine and an electric machine that can operate as an engine. According to a possible embodiment, a mechanical exciter is provided (e.g. arranged in the steering wheel or in the driver's seat), which is designed to generate mechanical vibrations and is driven only when the thermal engine is off and the advancing speed is lower than a predetermined threshold to indicate to the driver that the electric machine is active.

DESCRIPTION OF THE INVENTION

The object of the present invention is to provide a road vehicle equipped with an electric drive, which allows the driver to have pleasant vibro-acoustic sensations.

According to the present invention, it is provided a road vehicle with an electric drive as claimed in the appended claims.

The claims describe preferred embodiments of the present invention forming an integral part of the present disclosure.

BRIEF DESCRIPTION OF THE DRAWINGS

The present invention will now be described with reference to the annexed drawings showing an example of a non-limiting embodiment, in which.

PREFERRED EMBODIMENTS OF THE INVENTION

Figure 1:
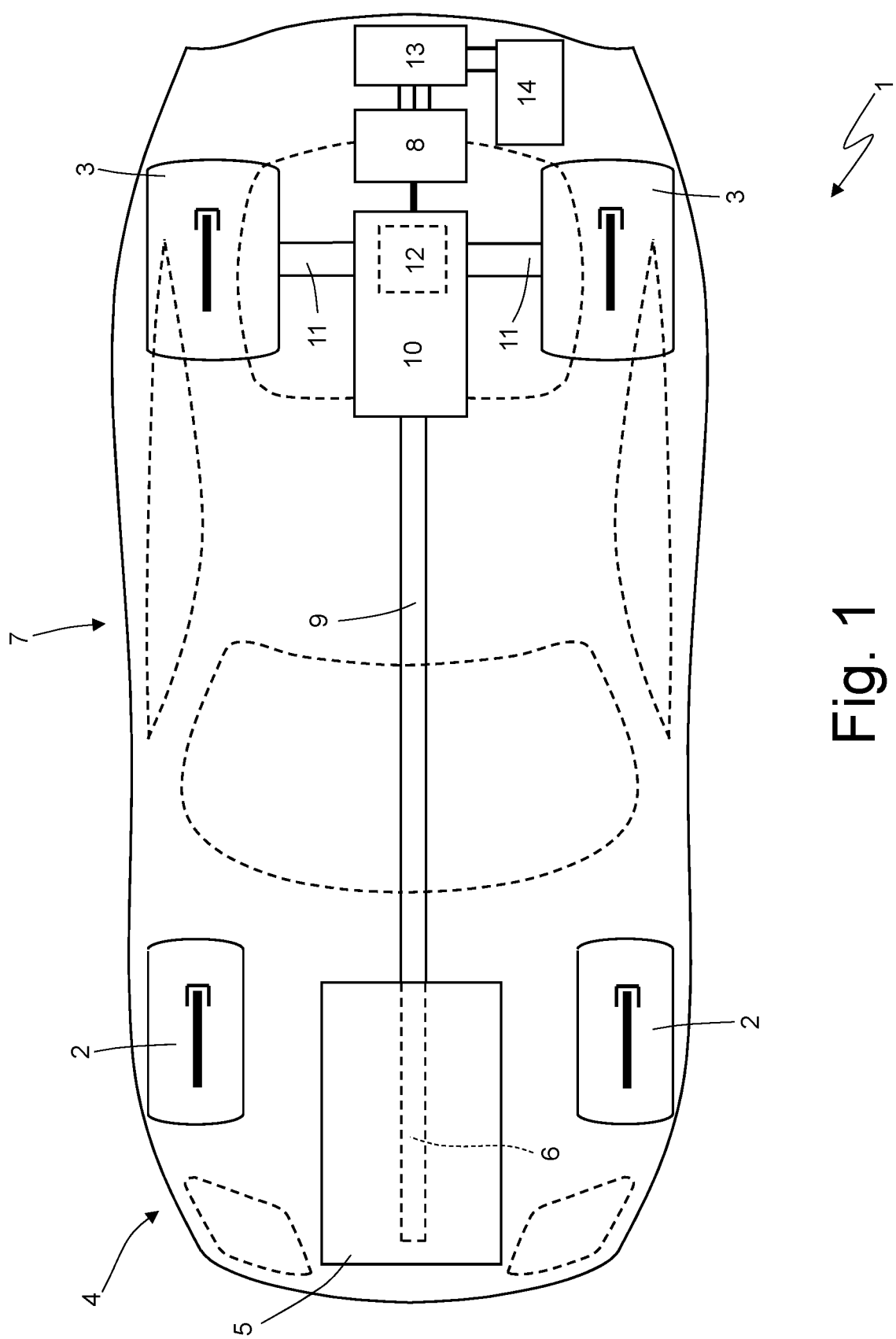
FIG. 1 is a schematic and plan view of a hybrid road vehicle equipped with an electric drive system made in accordance with the present invention.

In FIG. 1, the number 1 indicates as a whole a hybrid-driven road vehicle provided with two front wheels 2 and two rear drive wheels 3, which receive the driving torque from a hybrid drive system 4.

The hybrid drive system 4 comprises an internal combustion thermal engine 5, which is arranged in a front position and is provided with a drive shaft 6, a mechanical transmission 7, which transmits the driving torque generated by the internal combustion engine 5 to the rear drive wheels 3, and an electric machine 8 that is mechanically connected to the mechanical transmission 7 and is reversible (i.e. it can work both as an electric engine by absorbing electrical power and generating mechanical power and as an electric generator by absorbing mechanical power and generating electrical power).

The mechanical transmission 7 comprises a transmission shaft 9 that on the one side is angularly integral with the drive shaft 6 and on the other side is mechanically connected to a double clutch gearbox 10, which is arranged in the rear position and transmits the motion to the rear drive wheels 3 by means of two axle shafts (half-shafts) 11, which receive the motion from a differential 12. The electric machine 8 is mechanically connected to the gearbox 10 and in particular is angularly integral with a primary shaft of the gearbox 10. With regard to how to connect the electric machine 8 to the double clutch gearbox 10, for example, please refer to the patent application EP2325034A1.

Figure 2:
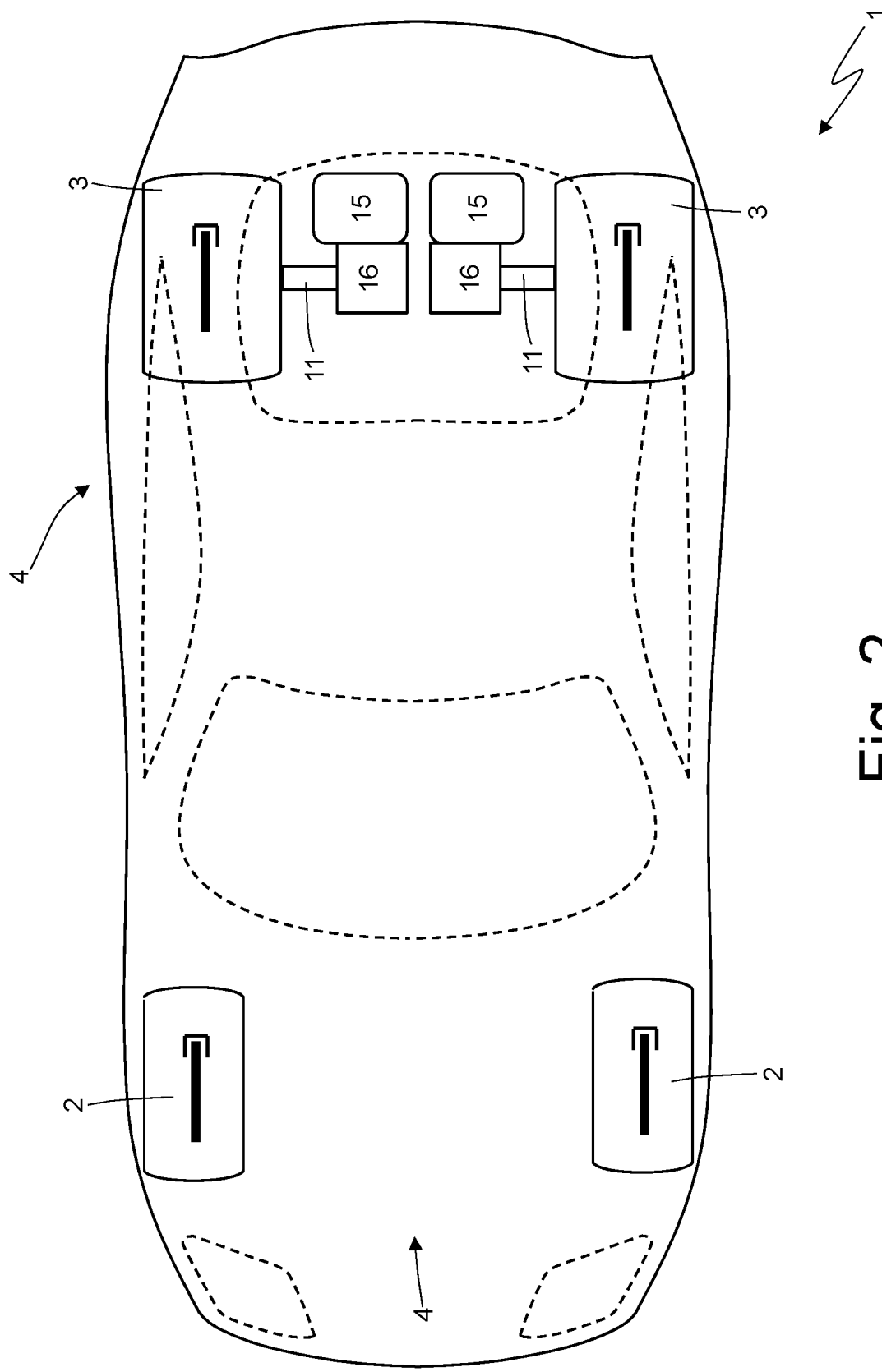
FIG. 2 is a schematic and plan view of an alternative embodiment of the road vehicle of FIG. 1 with an exclusively electric drive.
Figure 3:
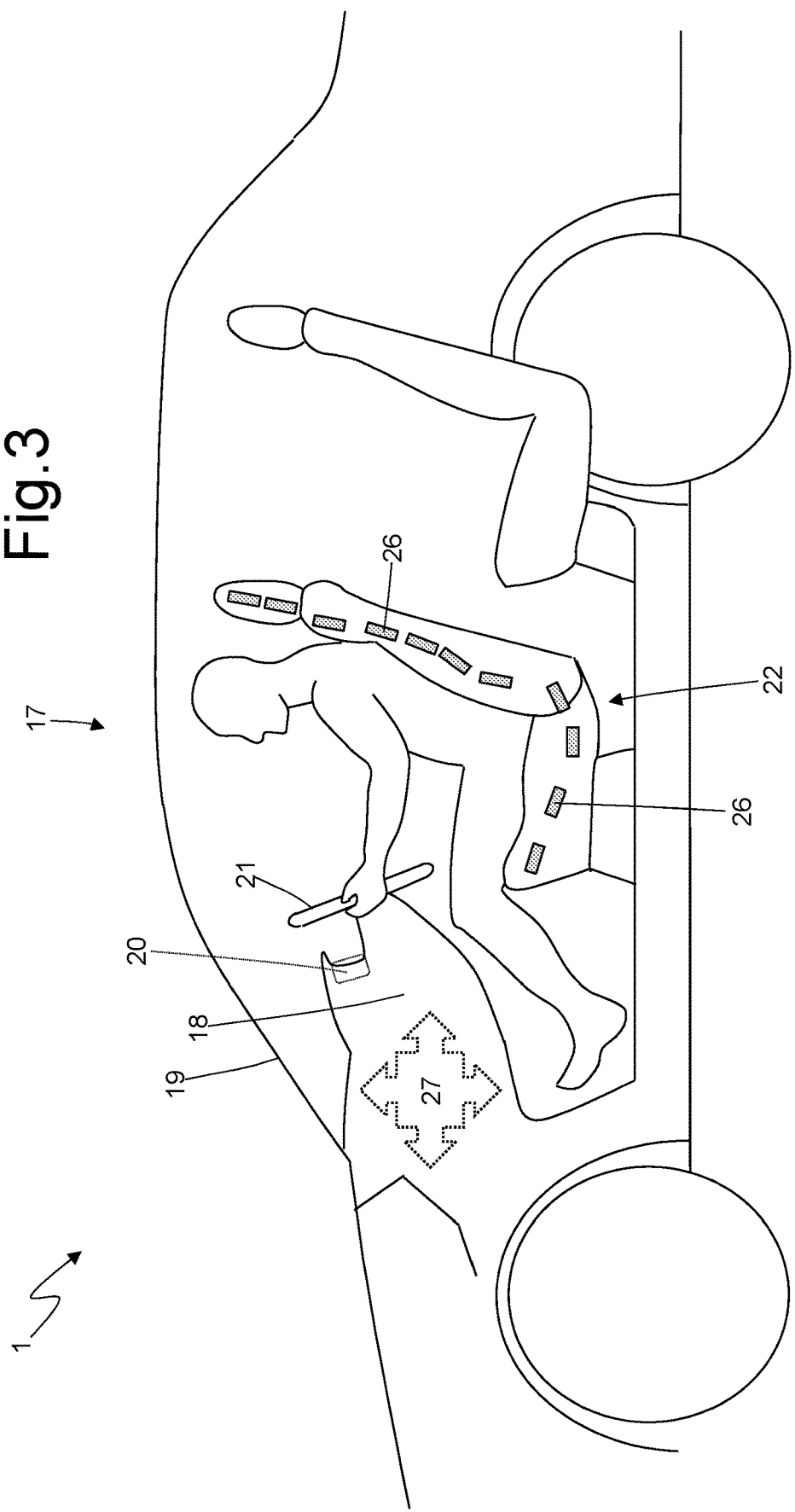
FIG. 3 is a schematic and lateral view of the road vehicle of FIG. 1.

FIG. 2 shows an alternative embodiment of the road vehicle 1, in which the drive system 4 instead of being hybrid is purely electric. In particular, the electric drive system 4 is arranged in the rear position and comprises two reversible electric machines 15, each of which is angularly integral with a corresponding rear drive wheel 3 (namely a corresponding axle shaft 11 of a rear drive wheel 3) by interposing a mechanical transmission 16 having its own (generally non-unitary) transmission ratio. In the embodiment shown in FIG. 2, the electric drive system 4 comprises two independent electric machines 15 to apply to the two rear drive wheels 3 differentiated driving torques (thus allowing the use of the "torque vectoring" control) and to avoid the use of a differential. According to a different embodiment not shown, the electric drive system 4 comprises a single electric machine 15 and a single mechanical transmission 16 provided with a differential from which the two axle shafts 11 depart. As shown in FIG. 3, the road vehicle 1 comprises a passenger compartment 17 frontally limited by a dashboard 18, which is arranged beneath a windshield 19. The dashboard 18 supports an instrument panel 20, which is arranged in front of the driver, immediately behind a steering wheel 21. A driving seat 22 is arranged inside the passenger compartment, said seat being arranged in front of the dashboard 18 (and therefore in front of the steering wheel 21).

Figure 4:
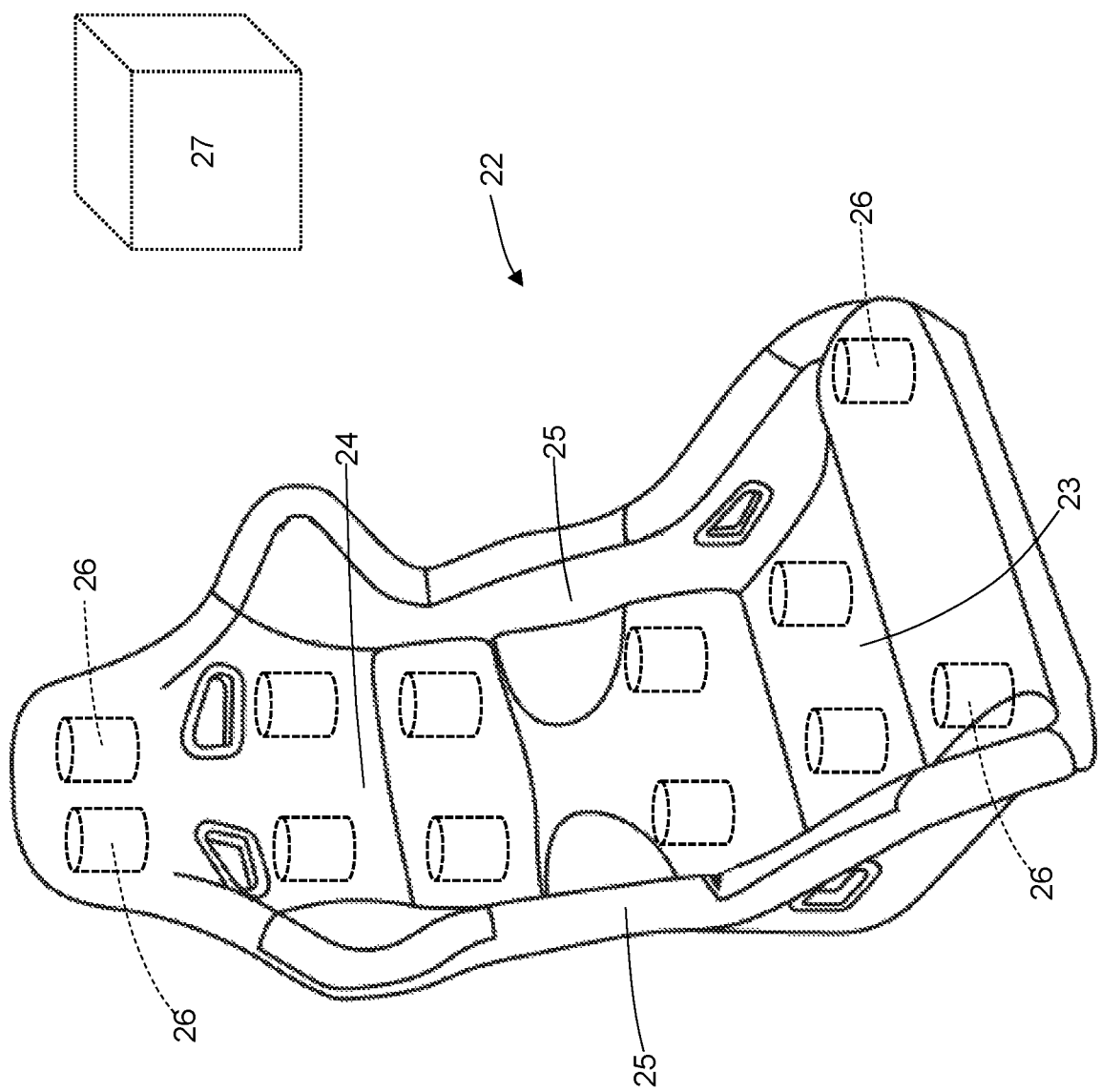
FIG. 4 is a schematic and perspective view of a driving seat of the road vehicle of FIG. 1.
Figure 5:
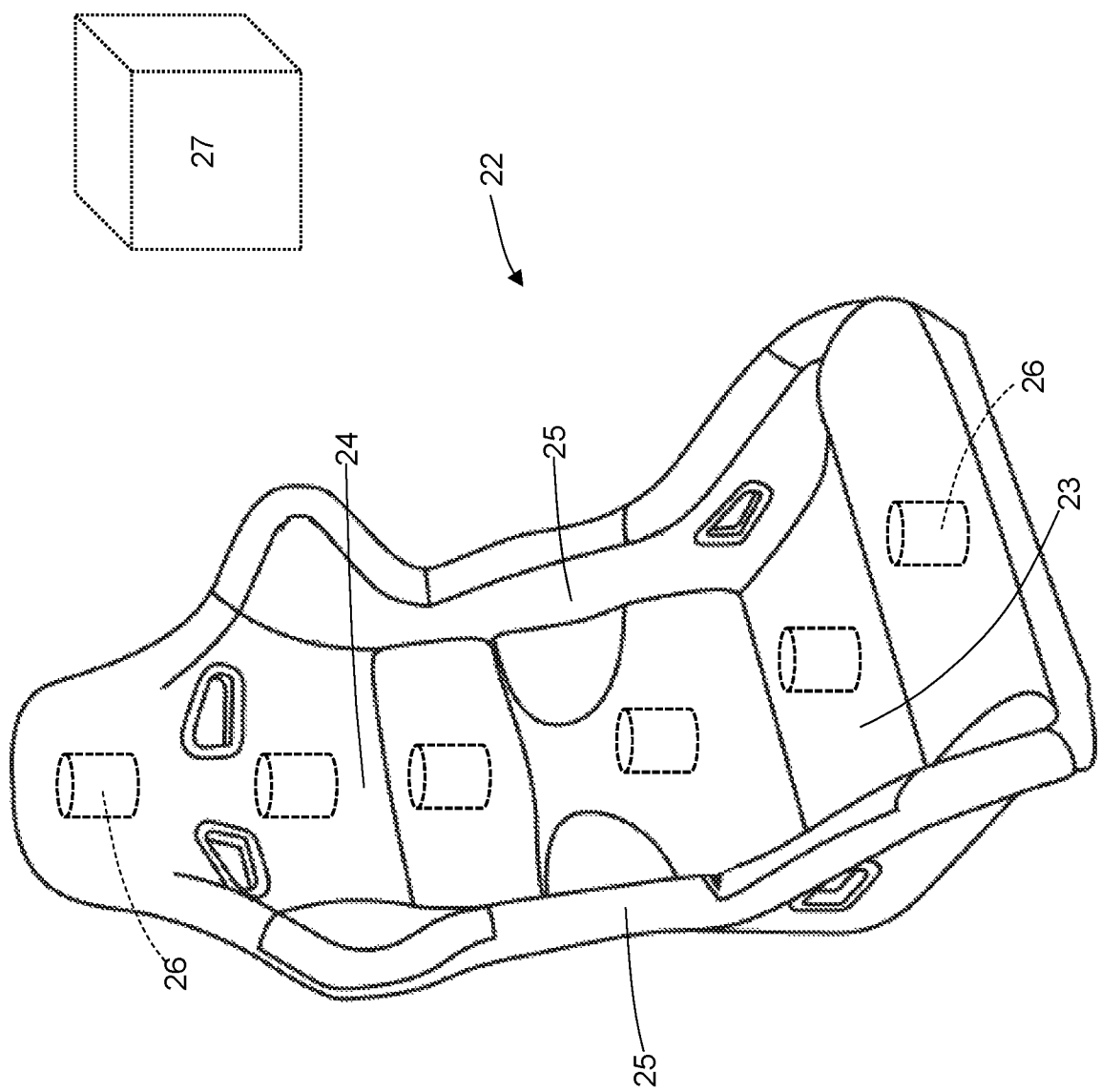
FIGS. 5, 6 and 7 are schematic and perspective views of respective variants of the driving seat of FIG. 4.
Figure 6:
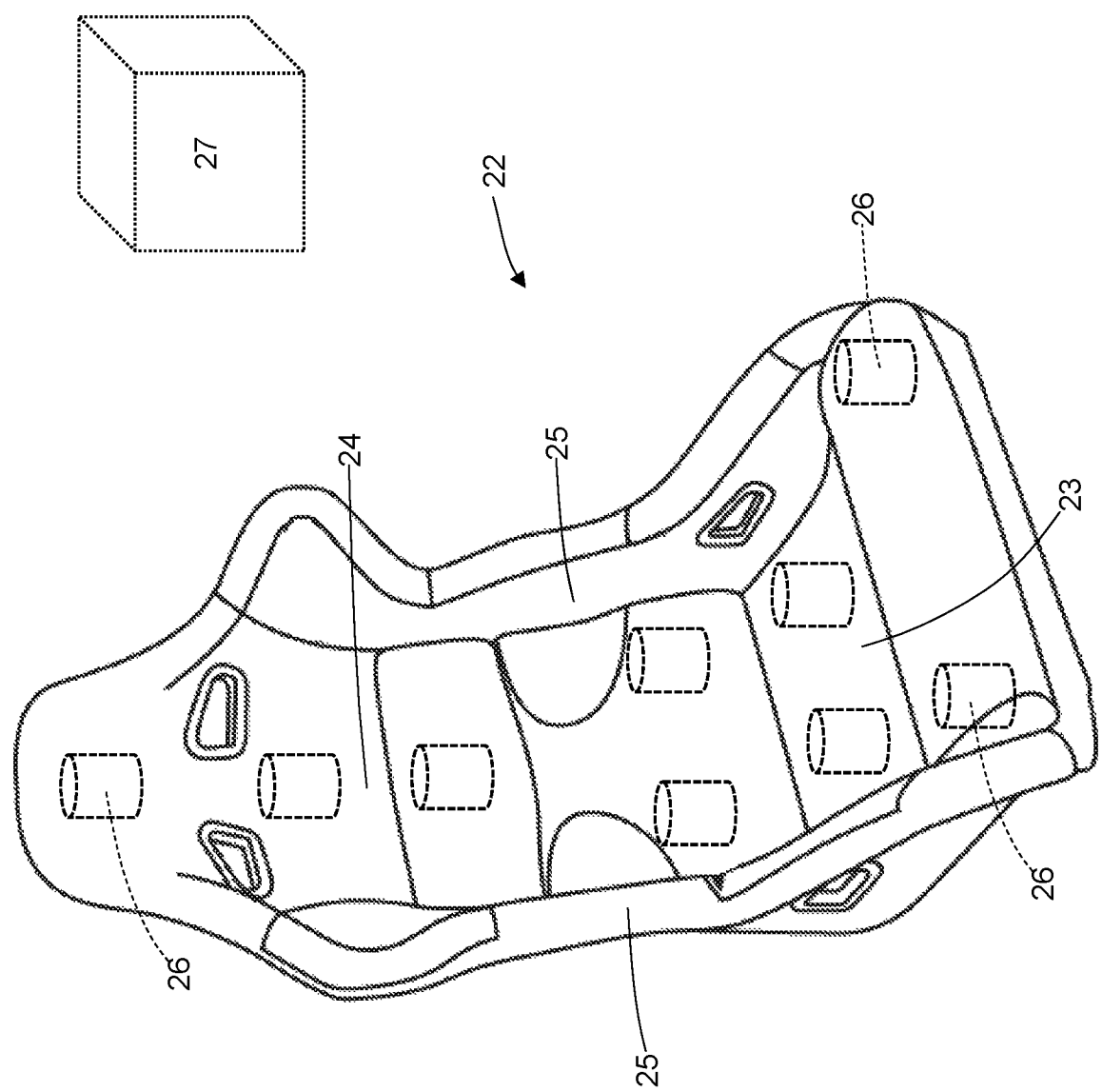
Figure 7:
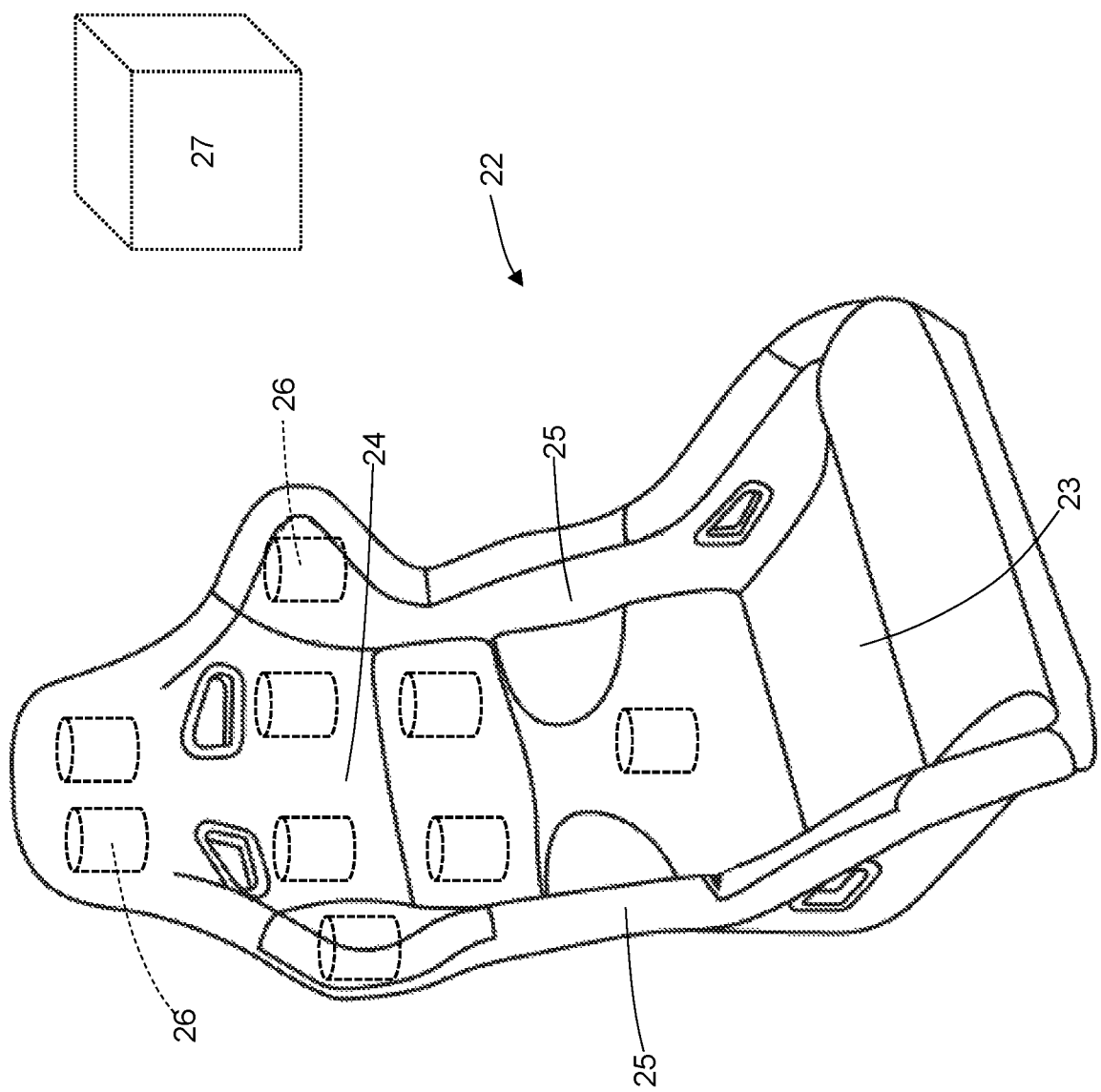

According to what shown in FIG. 4, the driving seat 22 comprises a seat bottom 23, which is substantially horizontal and on which the driver rests her/his legs, and a seat backrest 24, which is substantially vertical, ends with an (integrated) headrest and on which the driver rests her/his back. According to a preferred (but not limiting) embodiment, the driving seat 22 comprises two containment sides 25, which may be more or less accentuated and hold the driver sideways inside the driving seat 22. The two containment sides 25 normally develop both at the seat bottom 23 and at the seat backrest 24.

Mechanical exciters 26 (also called shakers) are embedded inside the driving seat 22 and are designed to generate mechanical vibrations with a variable frequency and intensity. As shown in the various embodiments of FIGS. 4-7, the number and the arrangement of the mechanical exciters 26 inside the driving seat 22 vary depending on the desired result and on the desired expense. The minimum configuration provides a single mechanical exciter 26 embedded in the driving seat 22 (generally near the headrest).

A control unit 27 is provided, which is designed to drive the mechanical exciters 26 by using a (previously stored) driving signal, which derives from the noise generated by an internal combustion thermal engine. For example, the driving signal could reproduce more or less faithfully the noise generated by an internal combustion engine or it could be a reprocessing of the noise generated by an internal combustion thermal engine that retains only some traits of the original noise.

The driving signal is modulated (changed) in frequency and amplitude based on the speed of rotation of the electric machine 8 or 15, and/or on the speed of rotation of the rear drive wheels 3 (i.e. the forward speed of the road vehicle 1, which is directly proportional to the speed of rotation of the rear drive wheels 3), and/or of the torque generated/absorbed by the electric machine 8 or 15. When there are two (or more) independent electric machines 15, only one of the electric machines 15 (namely a "master" electric machine 15) can be considered, or it can be considered an average of the electric machines 15 (i.e. it is considered an average speed of rotation of the electric machines 15 and an average generated/absorbed torque of the electric machines 15).

Please note that the speed of rotation of the electric machine 8 or 15 can be completely equivalent to the speed of rotation of the rear drive wheels 3 (when the mechanical transmission ratio between the shaft of the electric machine 8 or 15 and the rear drive wheels 3 is stable). In this case, only the speed of rotation of the electric machine 8 or 15 is considered, or only the speed of rotation of the rear drive wheels 3 is considered. Alternatively, the speed of rotation of the electric machine 8 or 15 may be different from the speed of rotation of the rear drive wheels 3 (when the mechanical transmission ratio between the shaft of the electric machine 8 or 15 and the rear drive wheels 3 is variable). In this case it is possible to consider only the speed of rotation of the electric machine 8 or 15, only the speed of rotation of the rear drive wheels 3, both the speed of rotation of the electric machine 8 or 15 and the speed of rotation of the rear drive wheels 3, an average (possibly weighted) of the speed of rotation of the electric machine 8 or 15 and of the speed of rotation of the rear drive wheels 3.

The control unit 27 is designed to drive the mechanical exciters 26 so that the mechanical exciters 26 generate vibrations having a frequency depending on the speed of rotation of the electric machine 8 or 15 and/or on the speed of rotation of the rear drive wheels 3. In other words, the control unit 27 modulates (varies) in frequency the driving signal based on the speed of rotation of the electric machine 8 or 15 and/or the speed of rotation of the rear drive wheels 3. In this case, the frequency of the vibrations generated by the mechanical exciters 26 increases by increasing the speed of rotation of the electric machine 8 or 15 and/or the speed of rotation of the rear drive wheels 3. In particular, the increase may be normal (the frequency of the vibrations generated by the mechanical exciters 26 is greater than or equal to the increase in the speed of rotation of the electric machine 8 or 15 and/or of the speed of rotation of the rear wheels 3), or the increase can be tight (the frequency of the vibrations generated by the mechanical exciters 26 is strictly higher by increasing the speed of rotation of the electric machine 8 or 15 and/or the speed of rotation of the rear drive wheels 3).

According to a possible embodiment, the frequency of the vibrations generated by the mechanical exciters 26 depends only on the speed of rotation of the electric machine 8 or 15 and/or on the speed of rotation of the rear drive wheels 3 (i.e. the frequency of the vibrations generated by the mechanical exciters 26 does not depend on the torque generated/absorbed by the electric machine 8 or 15).

According to an alternative embodiment, the frequency of the vibrations generated by the mechanical exciters 26 depends both on the speed of rotation of the electric machine 8 or 15 and/or on the speed of rotation of the rear drive wheels 3 and on the torque generated/absorbed by the electric machine 8 or 15. In this case, the dependence of the frequency of the vibrations generated by the mechanical exciters 26 on the torque generated/absorbed by the electric machine 8 or 15 is modest and provides that the frequency of the vibrations generated by the mechanical exciters 26 increases by increasing the torque generated/absorbed by the electric machine 8 or 15. In particular, the frequency of the vibrations generated by the mechanical exciters 26 depends for the most part (85-95%) on the speed of rotation of the electric machine 8 or 15 and/or on the speed of rotation of the rear drive wheels 3 and depends to a minimum extent (15-5%) on the torque generated/absorbed by the electric machine 8 or 15.

The control unit 27 is designed to drive the mechanical exciters 26 so that the mechanical exciters 26 generate vibrations having an intensity dependent on the torque generated/absorbed by the electric machine 8 or 15. In other words, the control unit 27 modulates (varies) in amplitude the driving signal based on the torque generated/absorbed by the electric machine 8 or 15. In this case, the intensity of the vibrations generated by the mechanical exciters 26 increases by increasing the torque generated/absorbed by the electric machine 8 or 15. In particular, the increase can be normal (the intensity of the vibrations generated by the mechanical exciters 26 is greater than or equal to the increase of the torque generated/absorbed by the electric machine 8 or 15), or the increase can be tight (the intensity of the vibrations generated by the mechanical exciters 26 is strictly higher by increasing the torque generated/absorbed by the electric machine 8 or 15).

According to a possible embodiment, the intensity of the vibrations generated by the mechanical exciters 26 depends only on the torque generated/absorbed by the electric machine 8 or 15 (i.e. the intensity of the vibrations generated by the mechanical exciters 26 does not depend on the speed of rotation of the electric machine 8 or 15 and/or on the speed of rotation of the rear drive wheels 3).

According to an alternative embodiment, the intensity of the vibrations generated by the mechanical exciters 26 depends both on the torque generated/absorbed by the electric machine 8 or 15 and on the speed of rotation of the electric machine 8 or 15 and/or on the speed of rotation of the rear drive wheels 3. In this case, the dependence of the intensity of the vibrations on the speed of rotation of the electric machine 8 or 15 and/or on the speed of rotation of the rear drive wheels 3 is modest and provides that the intensity of the vibrations generated by the mechanical exciters 26 increases by increasing the speed of rotation of the electric machine 8 or 15 and/or the speed of rotation of the rear drive wheels 3. In particular, the intensity of the vibrations generated by the mechanical exciters 26 depends for the most part (70-90%) on the torque generated/absorbed by the electric machine 8 or 15 and depends to a minimum extent (30-10%) on the speed of rotation of the electric machine 8 or 15 and/or on the speed of rotation of the rear drive wheels 3. According to a possible embodiment, the control unit 27 stores a mathematical map (namely a numeric matrix), which at the input receives the speed of rotation of the electric machine 8 or 15 and/or the speed of rotation of the rear drive wheels 3 and the torque generated/absorbed by the electric machine 8 or 15 (this value is generally marked to distinguish the generated torque from the absorbed torque) and at the output provides a pair of multiplier coefficients (potentially greater than, equal to or smaller than one), which allow modulating (varying) the frequency and the intensity the driving signal, respectively.

In the embodiment described above, the control unit 27 drives all the mechanical exciters 26 in exactly the same way (i.e. by using the same starting driving signal with the same amplitude and frequency modulation). According to a different embodiment, the control unit 27 drives differently the mechanical exciters 26 based on their position (e.g. the mechanical exciters 26 of the seat backrest 24 are driven differently with respect to the mechanical exciters 26 of the seat bottom 23, or the mechanical exciters 26 at the headrest are driven differently from the other mechanical exciters 26 of the seat backrest 24). The control unit 27 can differentiate the driving of the mechanical exciters 26 by differentiating the starting driving signal and/or by differentiating the amplitude and frequency modulation.

According to a possible embodiment, all the mechanical exciters 26 are identical. Alternatively, the mechanical exciters 26 could be different: for example, the mechanical exciters 26 embedded in the seat bottom 23 may be more powerful and have a lower dynamic capacity, while the mechanical exciters 26 embedded in the seat backrest 24 (particularly near the headrest) may be less powerful and have a greater dynamic capacity.

According to a possible embodiment, the control unit 27 could have stored several different starting signals (more or less sporty) which can, for example, be selected according to the driver's preferences (e.g. expressed through the so-called "manettino", which allows the driver to set the road vehicle 1 for a relaxed driving, for a sporty driving, for a racing driving, for driving in the wet, for driving on icy surfaces . . . ). Analogously, also the amplitude and frequency modulation of the starting driving signal could be varied based on the driver's preferences (e.g. expressed through the so-called "manettino").

In the embodiment described above, only the driving seat 22 is provided with mechanical exciters 26. According to other perfectly equivalent embodiments, the mechanical exciters 26 are also present in the passenger seats (possibly in a smaller number if compared to the driving seat 22).

By way of example, each mechanical exciter 26 is of the electrodynamic type and comprises a fixed ferromagnetic armature provided with at least one permanent magnet, which generates a constant magnetic field, and a coil (optionally coupled to a mobile ferromagnetic armature), which is axially floating through special linear guides, is immersed in the constant magnetic field, is integral with a vibrating mass (which can be formed by the mobile ferromagnetic armature) and can be flown through by an alternating current (namely variable over time). By varying the frequency and the intensity of the voltage applied to the coil (i.e. by varying the frequency and the intensity of the electric current that passes through the coil), also the frequency and the stroke of the oscillating movement of the coil vary (and therefore of the vibrating mass that is integral with the coil), and then the frequency and intensity of the vibrations generated by the mechanical exciters 26 vary.

In an electrodynamic mechanical exciter 26 the upper frequency limit is determined by the natural frequency of the coil and is of the order of some kHz (3-6 kHz). Moreover, an electrodynamic mechanical exciter 26 normally has a bad behaviour at frequencies lower than 5-10 Hz. These frequency limits are not problematic in this application, in which the vibrations to be generated by the mechanical exciters 26 generally have a frequency between 20-40 Hz and 2-3 kHz.

Please note that in particular situations (for example in an emergency) the mechanical exciters 26 embedded in the driving seat 22 can be used not to generate a pleasant vibro-acoustic sensation, but to provide the driver with a tactile sensation that calls the driver's attention. For example, the mechanical exciters 26 embedded in the driving seat 22 can be used when the driver shows a tendency to fall asleep, in the event of a possible/potential impact against an obstacle placed in front of the vehicle and in the event of overstepping the stripe that delimits the edge of the carriageway.

The embodiments described herein can be combined without departing from the scope of protection of the present invention.

The road vehicle 1 described above has numerous advantages. First, the road vehicle 1 described above allows locating the vibro-acoustic sensation generated by the mechanical exciters 26 in very close proximity to the users, since it concentrates the mechanical exciters 26 on the driving seat 22. This allows limiting the total number of mechanical exciters 26 and reaching the users in a direct way.

Moreover, the road vehicle 1 described above provides quite a natural reproduction of the vibro-acoustic sensation of a thermal engine, providing the users with a very pleasant and not too invasive experience. In other words, the vibro-acoustic sensation produced by the mechanical exciters 26 embedded in the driving seat 22 corresponds to the driver's wishes/expectations.

Finally, the road vehicle 1 described above is easy to manufacture, since a normal driving seat 22 offers a large usable space to easily embed the mechanical exciters 26.

LIST OF REFERENCE NUMBERS OF THE FIGURES 1 road vehicle
2 front wheels
3 rear wheels
4 drive system
5 engine
6 drive shaft
7 transmission
8 electric machine
9 transmission shaft
10 mechanical gearbox
11 axle shafts
12 differential
13 electronic power converter
14 accumulation system
15 electric machine
16 mechanical transmission
17 passenger compartment
18 dashboard
19 windshield
20 instrument panel
21 steering wheel
22 driving seat
23 seat bottom
24 seat backrest
25 containment sides
26 mechanical exciter
27 control unit

The invention claimed is:

1. A road vehicle (1) provided with an electric drive (4); the road vehicle (1) comprises:
   at least one pair of drive wheels (3);
   at least one electric machine (8, 15), which is connected to the drive wheels (3);
   a passenger compartment (17);
   at least one seat (22), which is housed in the passenger compartment (17) and is provided with at least one mechanical exciter (26) configured to generate mechanical vibrations with variable frequency and intensity; and
   a control unit (27) configured to drive the at least one mechanical exciter (26) to generate the mechanical vibrations, wherein the variable frequency is dependent on a rotational speed of the electric machine (8; 15) and/or a rotational speed of the drive wheels (3) and wherein the intensity is dependent on torque generated and/or absorbed by the electric machine (8; 15).

2. The road vehicle (1) according to claim 1, wherein the frequency of the mechanical vibrations generated by the at least one mechanical exciter (26) increases by increasing the rotational speed of the electric machine (8; 15) and/or the rotational speed of the drive wheels (3).

3. The road vehicle (1) according to claim 1, wherein the variable frequency of the mechanical vibrations generated by the at least one mechanical exciter (26) exclusively depends on the rotational speed of the electric machine (8; 15) and/or on the rotational speed of the drive wheels (3).

4. The road vehicle (1) according to claim 1, wherein the variable frequency of the vibrations generated by the at least one mechanical exciter (26) further depends on the torque generated and/or absorbed by the electric machine (8; 15).

5. The road vehicle (1) according to claim 4, wherein the variable frequency of the mechanical vibrations generated by the at least one mechanical exciter (26) increases by increasing the torque generated and/or absorbed by the electric machine (8; 15).

6. The road vehicle (1) according to claim 1, wherein the intensity of the mechanical vibrations generated by the at least one mechanical exciter (26) increases by increasing the torque generated and/or absorbed by the electric machine (8; 15).

7. The road vehicle (1) according to claim 1, wherein the intensity of the mechanical vibrations generated by the at least one mechanical exciter (26) exclusively depends on the torque generated and/or absorbed by the electric machine (8; 15).

8. The road vehicle (1) according to claim 1, wherein the intensity of the mechanical vibrations generated by the at least one mechanical exciter (26) further depends on the rotational speed of the electric machine (8; 15) and/or on the rotational speed of the drive wheels (3).

9. The road vehicle (1) according to claim 8, wherein the intensity of the mechanical vibrations generated by the at least one mechanical exciter (26) increases by increasing the rotational speed of the electric machine (8; 15) and/or the rotational speed of the drive wheels (3).

10. The road vehicle (1) according to claim 1, wherein the control unit (27) is designed to drive the at least one mechanical exciter (26) using a control signal, which is modulated in frequency based on the rotational speed of the electric machine (8; 15) and/or on the rotational speed of the drive wheels (3), and is modulated in amplitude based on the torque generated and/or absorbed by the electric machine (8; 15).

11. The road vehicle (1) according to claim 1, wherein the control unit (27) is configured to drive the at least one mechanical exciter (26) using a control signal, which derives from a noise generated by an internal combustion thermal engine.

12. The road vehicle (1) according to claim 11, wherein the control signal reproduces the noise generated by the internal combustion thermal engine.

13. The road vehicle (1) according to claim 1, wherein the at least one seat (22) comprises a plurality of the mechanical exciters (26) arranged in different positions; and the control unit (27) differently drives the mechanical exciters (26) based on their position by differentiating a starting driving signal and/or by differentiating an amplitude and frequency modulation.

14. The road vehicle (1) according to claim 1, wherein:
the at least one seat (22) comprises a plurality of the mechanical exciters (26) arranged in different positions; and
the plurality of the mechanical exciters (26) are different from each other, wherein the mechanical exciters (26) embedded in a seat bottom (23) of the at least one seat (2) are more powerful and have a lower dynamic capacity relative to the mechanical exciters (26) embedded in a seat backrest (24) of the at least one seat (2) having less power and higher dynamic capacity.

15. The road vehicle (1) according to claim 4, wherein:
a majority part of the variable frequency of the mechanical vibrations generated by the at least one mechanical exciter (26) depends on the rotational speed of the electric machine (8; 15) and/or on the rotational speed of the drive wheels (3); and
a minority part of the variable frequency of the mechanical vibrations generated by the at least one mechanical exciter (26) depends on the torque generated and/or absorbed by the electric machine (8; 15).

16. The road vehicle (1) according to claim 4, wherein:
85-95% of the variable frequency of the mechanical vibrations generated by the at least one mechanical exciter (26) depends on the rotational speed of the electric machine (8; 15) and/or on the rotational speed of the drive wheels (3); and
15-5% of the variable frequency of the mechanical vibrations generated by the at least one mechanical exciter (26) depends on the torque generated and/or absorbed by the electric machine (8; 15).

17. The road vehicle (1) according to claim 8, wherein
a majority part of the intensity of the mechanical vibrations generated by the at least one mechanical exciter (26) depends on the torque generated and/or absorbed by the electric machine (8; 15); and
a minority part of the intensity of the mechanical vibrations generated by the at least one mechanical exciter (26) depends on the rotational speed of the electric machine (8; 15) and/or on the rotational speed of the drive wheels (3).

18. The road vehicle (1) according to claim 8, wherein:
70-90% of the intensity of the mechanical vibrations generated by the at least one mechanical exciter (26) depends on the torque generated and/or absorbed by the electric machine (8; 15); and
30-10% of the intensity of the vibrations generated by the at least one mechanical exciter (26) depends on the rotational speed of the electric machine (8; 15) and/or on the rotational speed of the drive wheels (3).

* * * * *